(12) United States Patent
Filar et al.

(10) Patent No.: US 11,616,815 B2
(45) Date of Patent: *Mar. 28, 2023

(54) CHATBOT INTERFACE FOR NETWORK SECURITY SOFTWARE APPLICATION

(71) Applicant: Endgame, Inc., Arlington, VA (US)

(72) Inventors: Robert Filar, Alexandria, VA (US); Richard Seymour, Arlington, VA (US); Howard Michael Nichols, Mclean, VA (US); Guillermo Menjivar, Burke, VA (US); James Brown, Arlington, VA (US); Devin McAfee, San Francisco, CA (US)

(73) Assignee: Endgame, Inc., Mountain View, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 17/183,220

(22) Filed: Feb. 23, 2021

(65) Prior Publication Data

US 2021/0176282 A1 Jun. 10, 2021

Related U.S. Application Data

(63) Continuation of application No. 16/143,270, filed on Sep. 26, 2018, now Pat. No. 10,938,858.

(60) Provisional application No. 62/565,867, filed on Sep. 29, 2017.

(51) Int. Cl.
| | | |
|---|---|---|
| *H04L 9/40* | (2022.01) | |
| *H04L 51/02* | (2022.01) | |
| *G10L 15/22* | (2006.01) | |
| *G10L 15/18* | (2013.01) | |
| *G06F 40/30* | (2020.01) | |
| *G06F 40/295* | (2020.01) | |
| *G10L 15/26* | (2006.01) | |
| *H04L 51/04* | (2022.01) | |

(52) U.S. Cl.
CPC ............ *H04L 63/20* (2013.01); *G06F 40/295* (2020.01); *G06F 40/30* (2020.01); *G10L 15/1815* (2013.01); *G10L 15/22* (2013.01); *H04L 51/02* (2013.01); *H04L 63/1441* (2013.01); *G10L 15/26* (2013.01); *H04L 51/04* (2013.01)

(58) Field of Classification Search
CPC ..... H04L 63/20; H04L 63/1441; H04L 51/02; H04L 51/04; G06F 40/30; G06F 40/295; G10L 15/22; G10L 15/1815; G10L 15/26
USPC .......................................................... 726/1
See application file for complete search history.

(56) References Cited

U.S. PATENT DOCUMENTS

| | | |
|---|---|---|
| 10,938,858 B2 | 3/2021 | Filar et al. |
| 2005/0182910 A1 | 8/2005 | Stager et al. |
| 2012/0260263 A1* | 10/2012 | Edoja .................... G06F 16/958 719/313 |

(Continued)

*Primary Examiner* — Samson B Lemma
(74) *Attorney, Agent, or Firm* — Quinn IP Law

(57) ABSTRACT

A chatbot interface is provided for a network security software application. The chatbot interface can receive and act upon text utterances from a user or from a speech-to-text engine in instances where the user provided a voice utterance. The chatbot interface also can automatically perform tasks relating to network security. In one embodiment, the chatbot interface receives a text utterance, performs named entity recognition on the text utterance, performs intent classification to determine the intent of the text utterance, and performs an action based on the determined intent.

18 Claims, 15 Drawing Sheets

(56) References Cited

U.S. PATENT DOCUMENTS

| | | | |
|---|---|---|---|
| 2013/0332162 A1* | 12/2013 | Keen | G06F 40/289 |
| | | | 704/235 |
| 2016/0148116 A1* | 5/2016 | Bornea | G06N 5/022 |
| | | | 706/12 |
| 2016/0378080 A1* | 12/2016 | Uppala | G10L 15/22 |
| | | | 700/275 |
| 2017/0180284 A1* | 6/2017 | Smullen | H04L 69/14 |
| 2018/0129181 A1* | 5/2018 | Kratzer, III | G06F 40/30 |
| 2018/0358010 A1* | 12/2018 | Eidem | G10L 15/22 |
| 2019/0104157 A1 | 4/2019 | Filar et al. | |
| 2021/0157504 A1 | 5/2021 | Hinman | |

\* cited by examiner

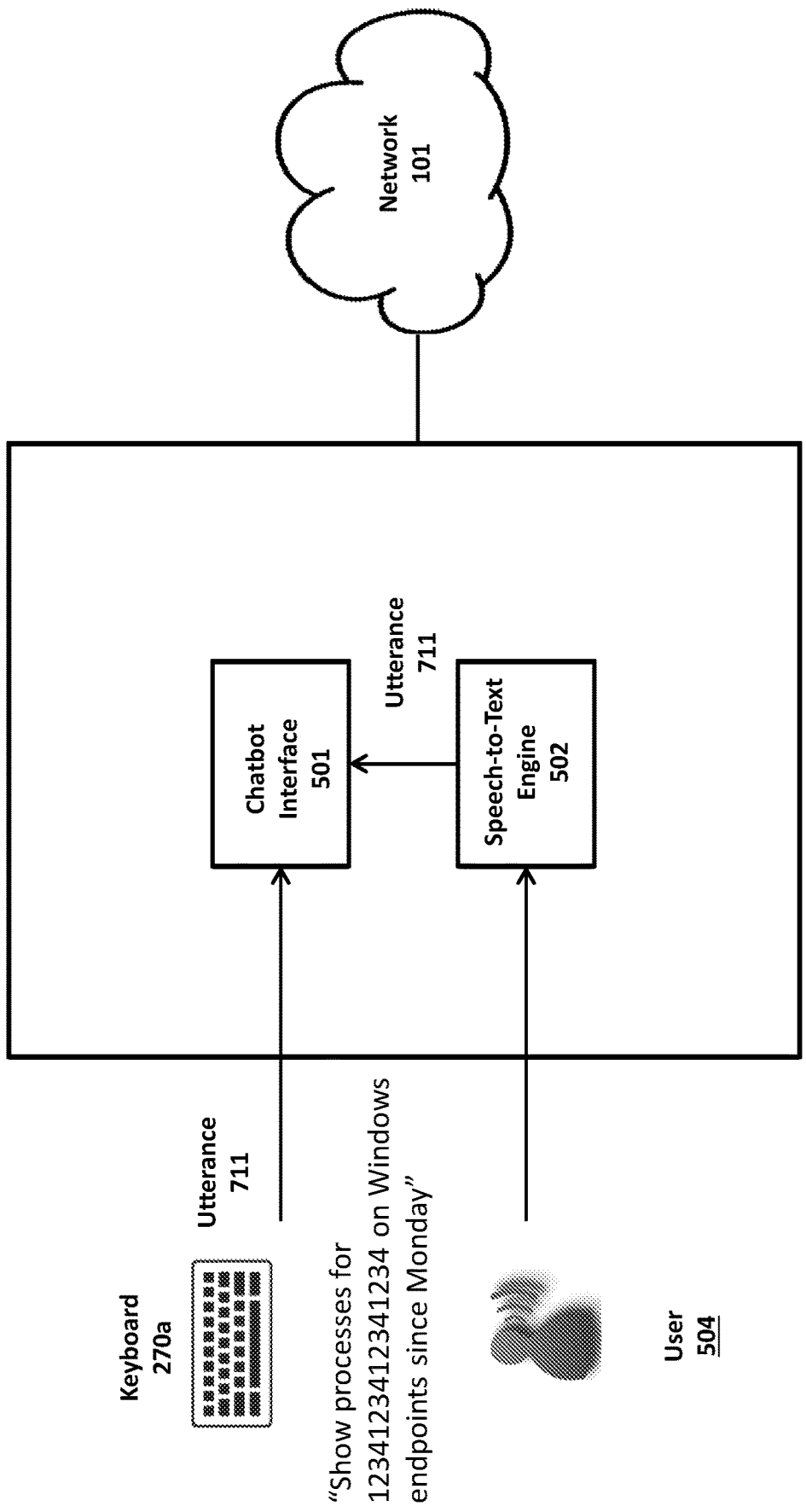

CHATBOT INTERFACE FOR NETWORK SECURITY SOFTWARE APPLICATION

CROSS REFERENCE TO APPLICATIONS

This application is a continuation of, and claims the benefit and priority of U.S. application Ser. No. 16/143,270, filed on Sep. 26, 2018, titled "CHATBOT INTERFACE FOR NETWORK SECURITY SOFTWARE APPLICATION", which claims the benefit and priority of U.S. Provisional Patent Application No. 62/565,867, filed on Sep. 29, 2017, and titled, "Chatbot Interface for Network Security Software Application," all of which are incorporated by reference herein.

FIELD OF THE DISCLOSURE

A chatbot interface is provided for a network security software application. The chatbot interface can receive and act upon text utterances or voice utterances from a user. The chatbot interface also can automatically perform tasks relating to network security.

BACKGROUND

Cyberattacks are becoming more prevalent and represent an increasing threat to information technology systems in homes and businesses of all sizes. As a result, network security software is a burgeoning field.

An exemplary prior art network security software system will be described with reference to FIGS. 1-4. In FIG. 1, computing device 100 connects to network 101. Network 101 comprises servers, storage devices, switches, routers, firewalls, network monitors, network interfaces and connections, and other known devices. Network 101 can be a local area network (as might be used within an organization at a single physical location), a wide area network (as might be used across an organization with multiple physical locations), or any other type of network.

FIG. 2 depicts hardware components of computing device 100. Computing device 100 comprises processor 210, memory 220, non-volatile storage 230, microphone 240, speaker 250, display 260, and input device 270. Non-volatile storage 230 optionally is a non-transitory storage medium such as a hard disk drive or flash memory array. Input device 270 can include a keyboard, keypad, mouse, touchscreen, or other device for receiving input from a user. Computing device 100 can be a server, desktop computer, notebook computer, mobile device, or other type of device capable of implementing the embodiments described below.

FIG. 3 depicts software components of computing device 100. Computing device 100 comprises operating system 301 (such as the operating system known by the trademarks "WINDOWS" "MACOS," "ANDROID," "IOS," or "LINUX") and security application 302. Security application 302 comprises lines of software code stored in non-volatile storage 230 and loaded and executed by processor 210 to perform network security functions.

FIG. 4 illustrates some exemplary network security functions performed by security application 302. These functions include:

Device Protection 401: Security application 302 prevents and detects malicious attacks (such as through malware, ransomware, or other vehicles) on network 101 and components thereof.

Threat Analysis 402: Security application 302 gathers intelligence and maintains reputation data to determine if a file, website, or third-party sender of a communication is to be trusted or not.

Restoration 403: Security application 302 provides tools for a user to restore network 101 and components thereof after a malicious attack.

Data Collection and Analysis 404: Security application 302 provides tools for collecting and analyzing data as to files, registries, users, processes, network 101 itself, netflow, DNS data, and other network data and events. Data is analyzed to identify malicious activity.

Deployment 405: Security application 302 allows a user to protect network 101 and components thereof and to deploy devices on network 101 after a malicious attack or potential attack has been ameliorated.

Notably, in the prior art, a user (which is this context typically will be a network administrator or IT professional) must enter specific commands using keyboard 270a according to the specific query language (using specific phrases, structure, and syntax) utilized by security application 302. This requires the user to be fully trained on security application 302. Moreover, typing specific commands with a keyboard can be a tedious, slow, and error-prone process. It is a poor way to manage and perform network security tasks when time is of the essence, as would be the case if network 101 is under attack from malware.

In unrelated areas of prior art, chatbot interfaces are known. For example, certain prior art mobile devices offer a chatbot interface that allows the user to request information using a spoken, natural language command. In another area of prior art, companies often provide online customer service systems that enable a customer to engage in a textual chat session with a server, again using natural language commands.

These examples are illustrated in FIG. 5, where user 504 either speaks or uses keyboard 270a to provide input to chatbot interface 501, which is a software engine within computing device 100. Spoken commands are received by microphone 240 (not shown) and converted into text by speech-to-text engine 502, which then will provide the command in text form to chatbot interface 501. Chatbot interface 501 and speech-to-text engine 502 each comprises lines of code stored in non-volatile storage 230 and loaded and executed by processor 210. Computing device 100 optionally can communicate with server 503 in response to the user query or command.

These types of chatbot interfaces involve a word recognition feature, where the words that were spoken or written by a person are determined, and an intent classification feature, where the meaning of the words and the intent of the person are determined. For instance, if a user says or writes "Tell me the weather," the receiving system needs to recognize which words were uttered, and then it needs to determine that the user was asking for information about the day's weather. After determining intent, the prior art systems obtain the requested information and provide it to the user, sometimes using synthesized speech.

However, the prior art completely lacks any chatbot interfaces for use with network security applications. Instead, designers of network security applications have assumed that users of the network security applications will study lengthy user manuals to learn intricate query languages utilized by the applications.

What is needed is a chatbot interface for use with network security software, where users can speak or type a query using natural language.

BRIEF SUMMARY OF THE INVENTION

A chatbot interface is provided for a network security software application. The chatbot interface can receive and act upon text utterances or voice utterances from a user. The chatbot interface also can automatically perform tasks relating to network security.

BRIEF DESCRIPTION OF THE DRAWINGS

FIG. 8A depicts a user making an utterance to a computing device.

DETAILED DESCRIPTION OF PREFERRED EMBODIMENTS

An improved system and method will be described with reference to FIGS. 6-8.

Figure 1:
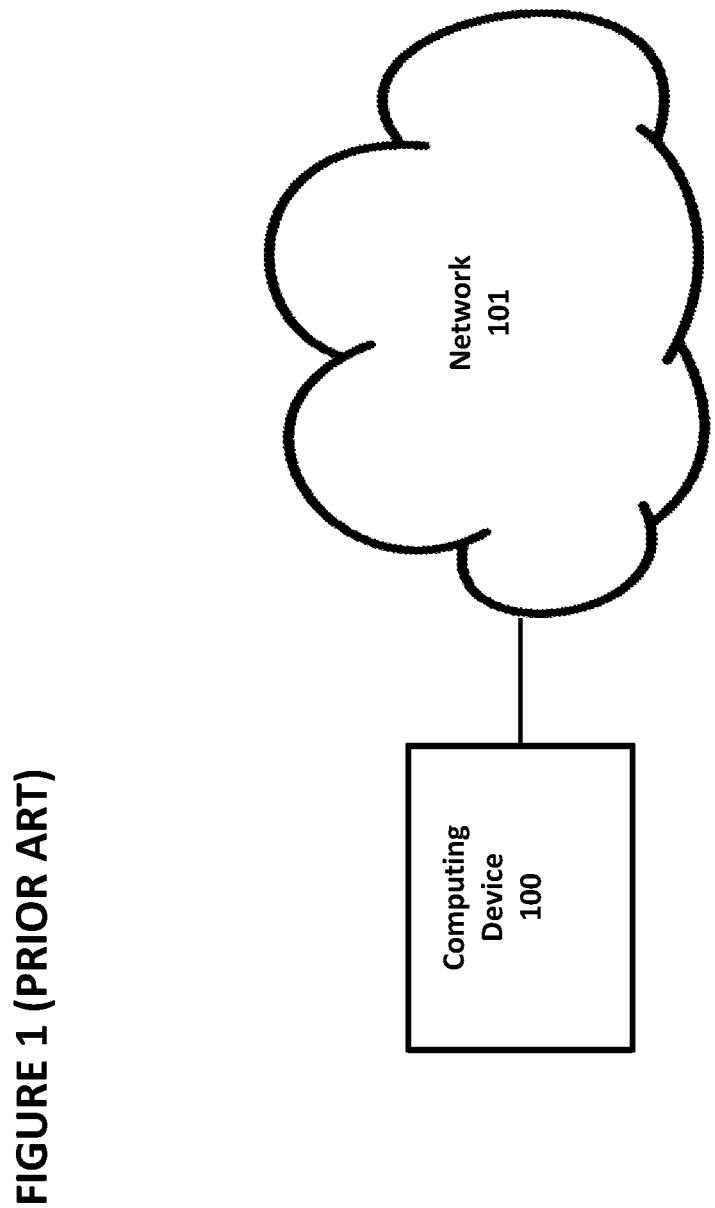
FIG. 1 depicts a prior art network security system.
Figure 2:
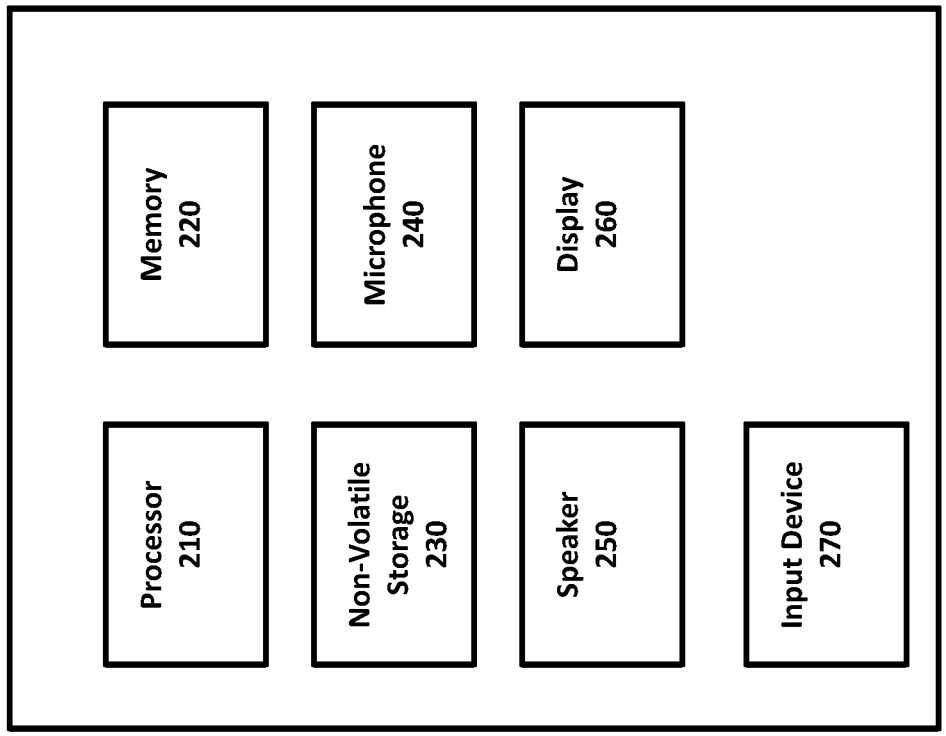
FIG. 2 depicts hardware components of a prior art computing device.
Figure 3:
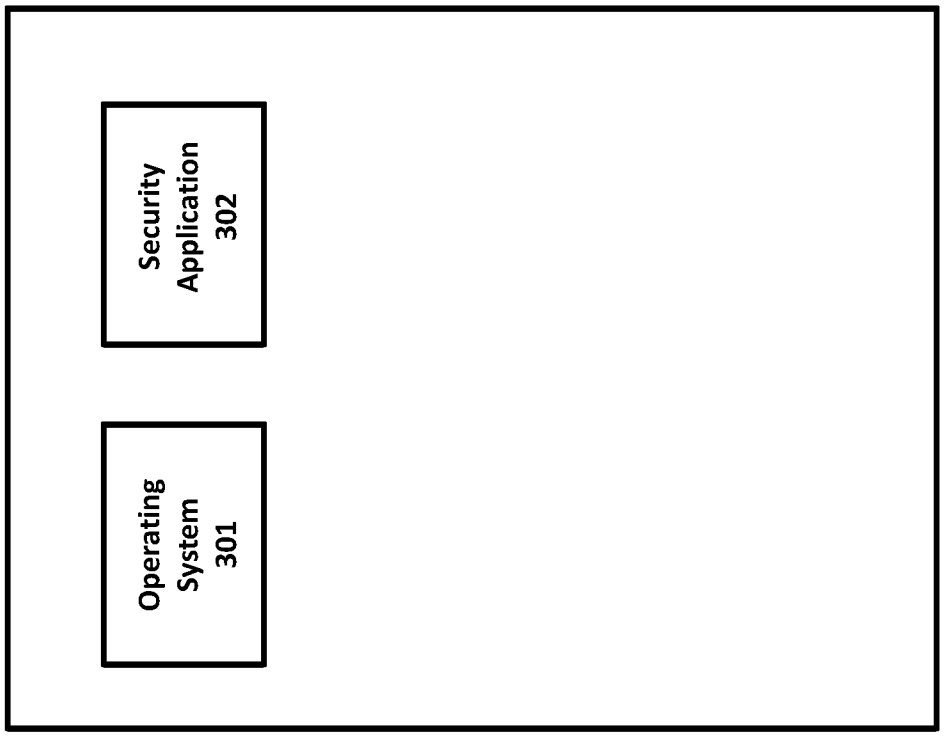
FIG. 3 depicts software components of a prior art computing device.
Figure 4:
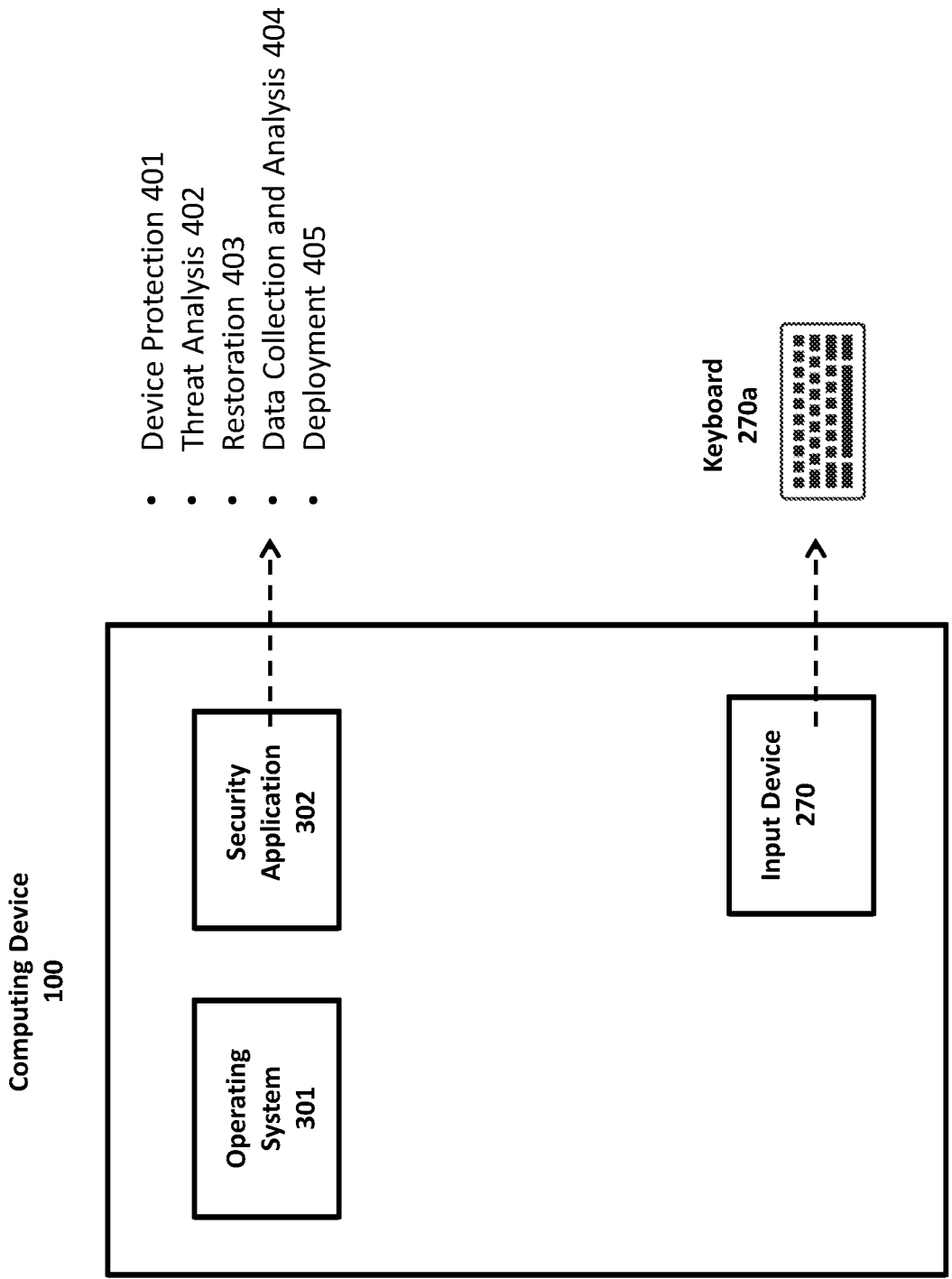
FIG. 4 depicts typical functions that can be performed by a prior art network security application.
Figure 5:
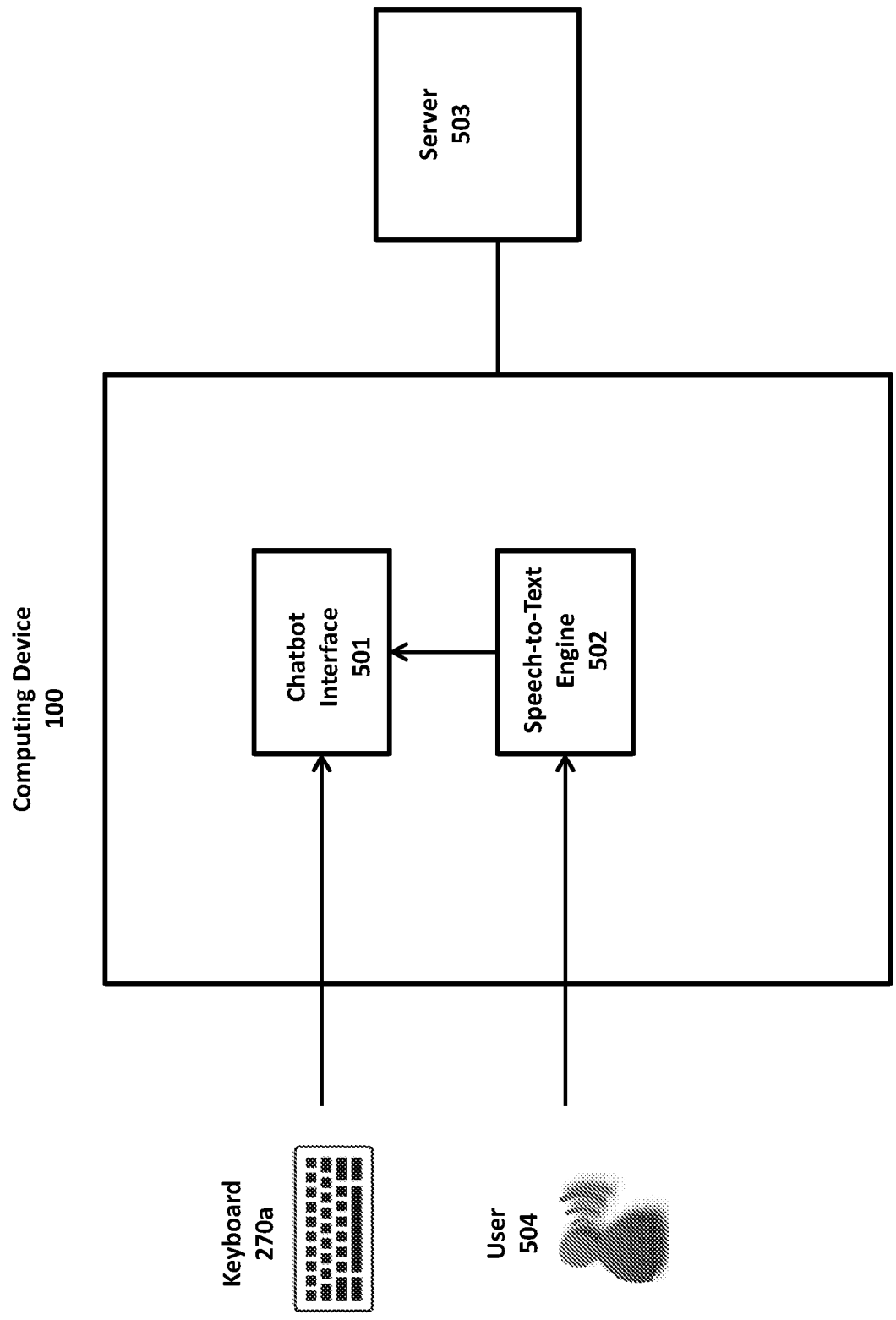
FIG. 5 depicts an embodiment of a chatbot interface.
Figure 6:
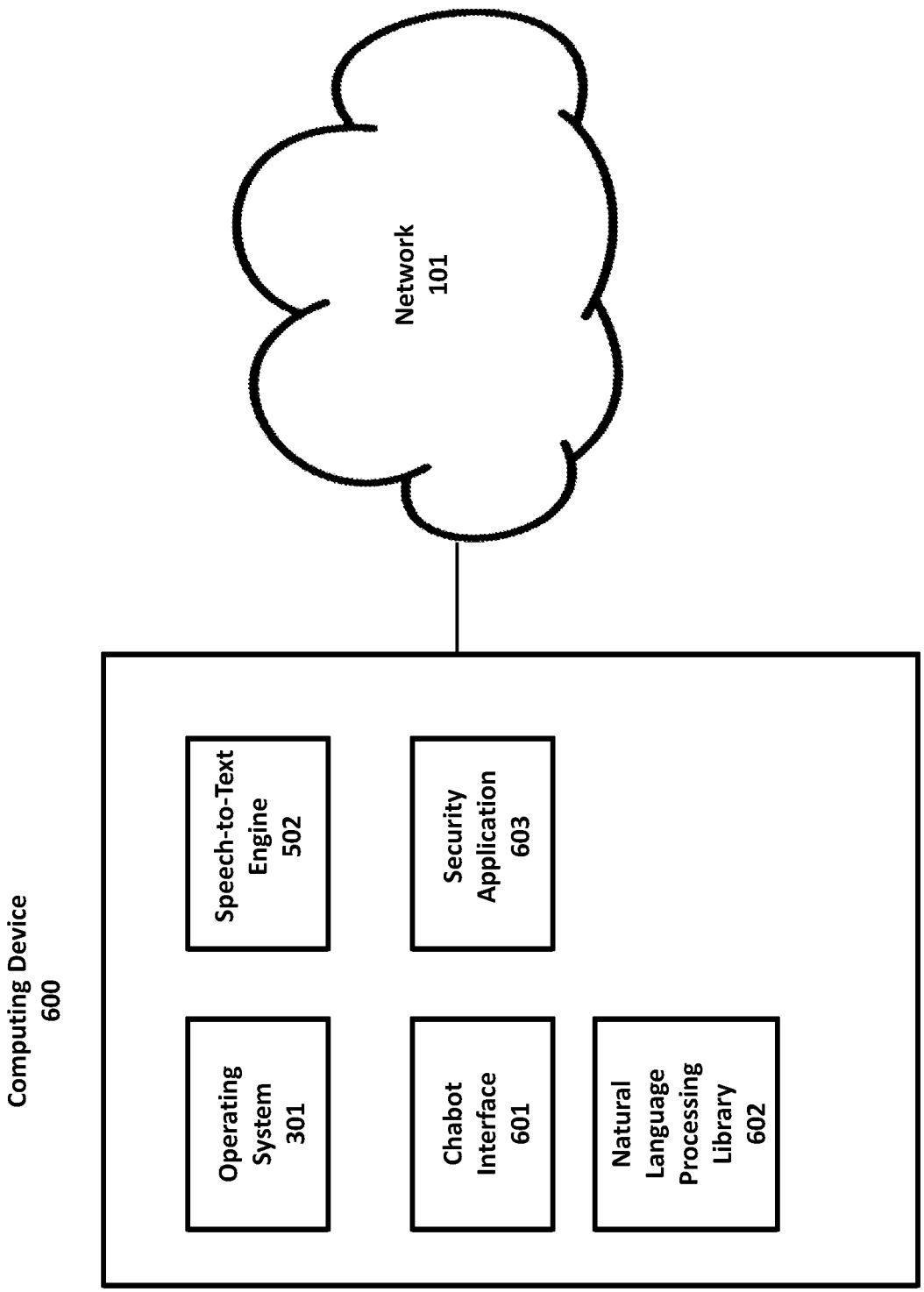
FIG. 6 depicts an embodiment of a computing device running a chatbot interface and utilizing a natural language processing library.

With reference to FIG. 6, computing device 600 comprises the same hardware components (not shown) as computing device 100 in FIG. 2. Computing device 600 further comprises software components including operating system 301, speech-to-text engine 502, chatbot interface 601, natural language processing library 602, and security application 603.

Figure 7:
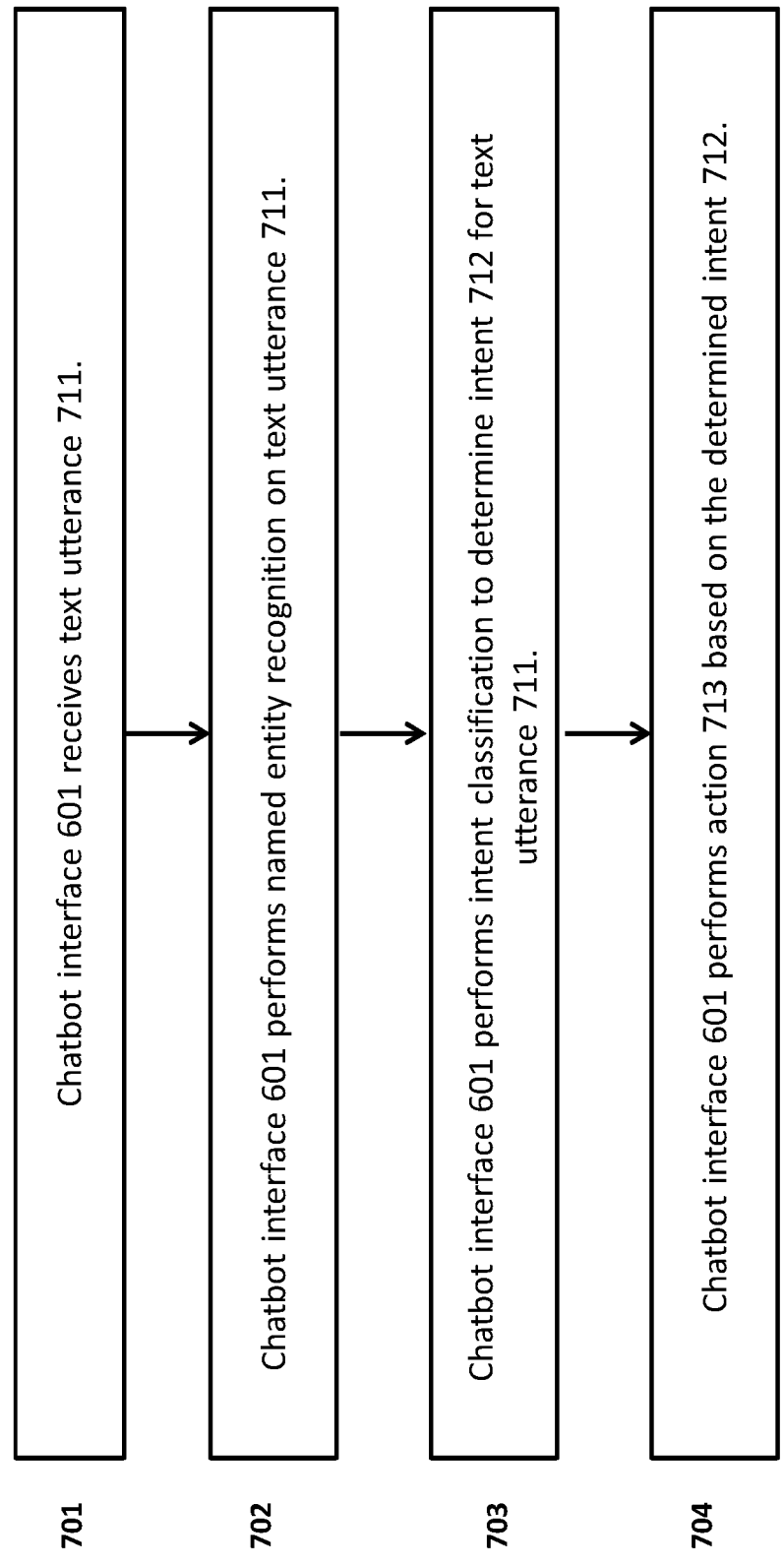
FIG. 7 depicts a method of receiving a voice or written utterance from a user, analyzing the utterance, determining an intent of the utterance, and performing an action based on the intent.

FIG. 7 depicts a chatbot interface method 700 implemented by chatbot interface 601. Chatbot interface 601 receives text utterance 711 (step 701). Text utterance 711 can be provided by keyboard 270a if user 504 types a command, by other input device 270, or by speech-to-text engine 502 if the user provided a spoken command. Chatbot interface 601 then performs named entity recognition on text utterance 711 (step 702). Chatbot interface 601 then performs intent classification to determine intent 712 for text utterance 711 (step 703). Finally, chatbot interface 601 performs action 713 based on determined intent 712 (step 704).

Named entity recognition (step 702) utilizes natural language processing library 602 to determine the nouns or entities contained in text utterance 711. Examples of the types of nouns or entities that can be stored in natural language processing library 602 and recognized during the named entity recognition step include the following:

Filename
MD5 (a type of cryptographic hash algorithm)
SHA1 (a type of cryptographic hash algorithm)
SHA256 (a type of cryptographic hash algorithm)
Username
Domain name IP address Port
PID (a process identifier) Registry
Endpoint Operating System (where the endpoint is a device on network 101)
Endpoint Hostname
Endpoint IP Address Intent 712 typically will be limited to the types of commands that can be performed by security application 603 and may involve one or more named entities identified during the named entity recognition (step 702). In other words, the intent of text utterance 711 usually will be to perform a query that could be submitted to security application 603 in an environment that lacks chatbot interface 601. This essentially allows user 504 to provide a text or voice query using natural language, with the end result being that intent 712 will be determined based on that query. The different types of intent 712 that can be utilized in this embodiment of security application 603 include the following:

Command and Control (C2) Hunting
Cancel (clear conversation)
Greeting
Process Lineage
Search DNS
Search Network
Search Process
Search Powershell
Search User Login
Search Registry
Search File Once named entity recognition is performed (step 702) and intent classification is performed (step 703), chatbot interface performs action 713, which executes the user's intent as expressed in text utterance 711. Action 713 typically will be an action that is made available by security application 603.

Figure 8B:
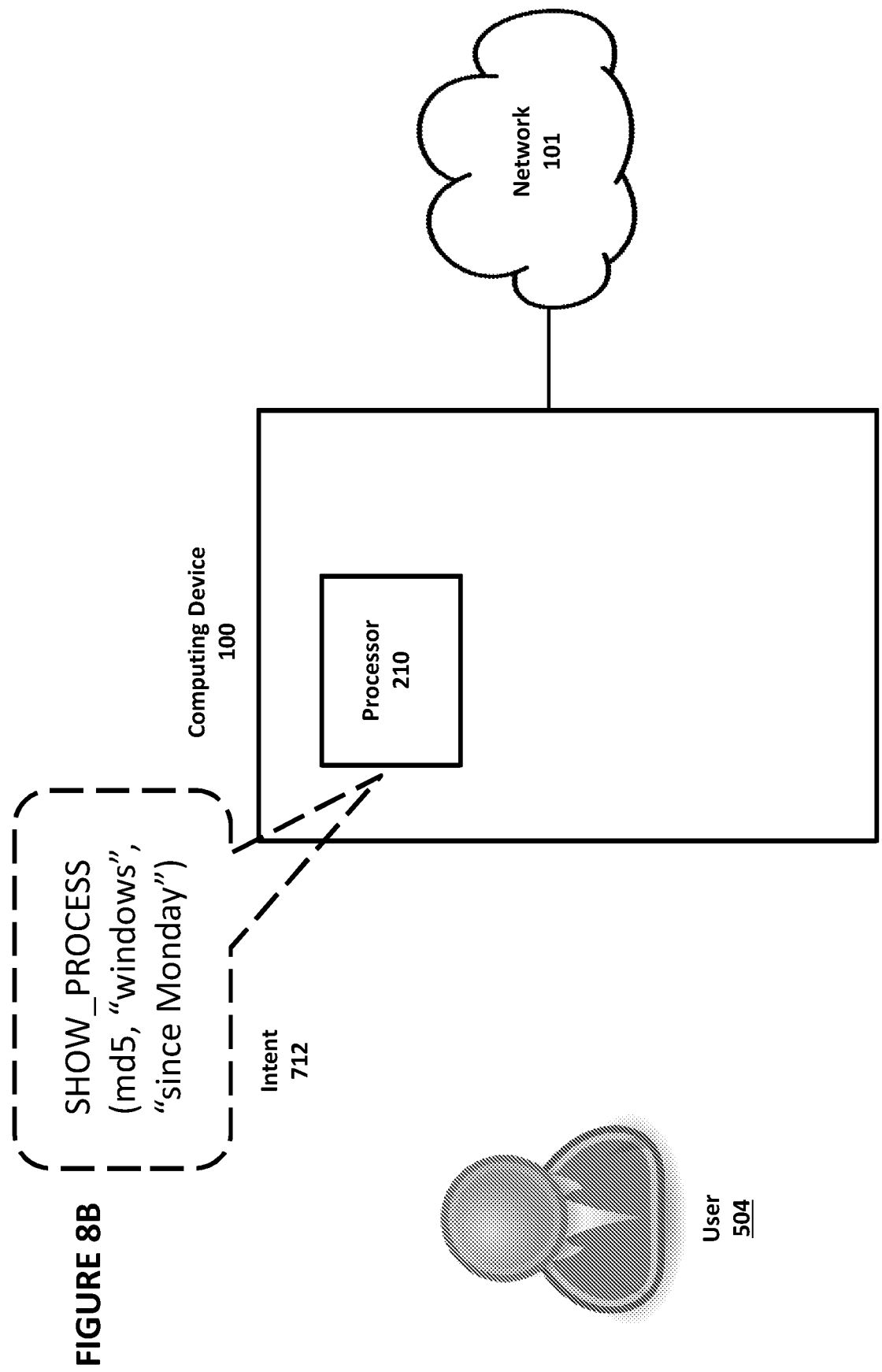
FIG. 8B depicts the computing device determining the intent of the utterance.
Figure 8C:
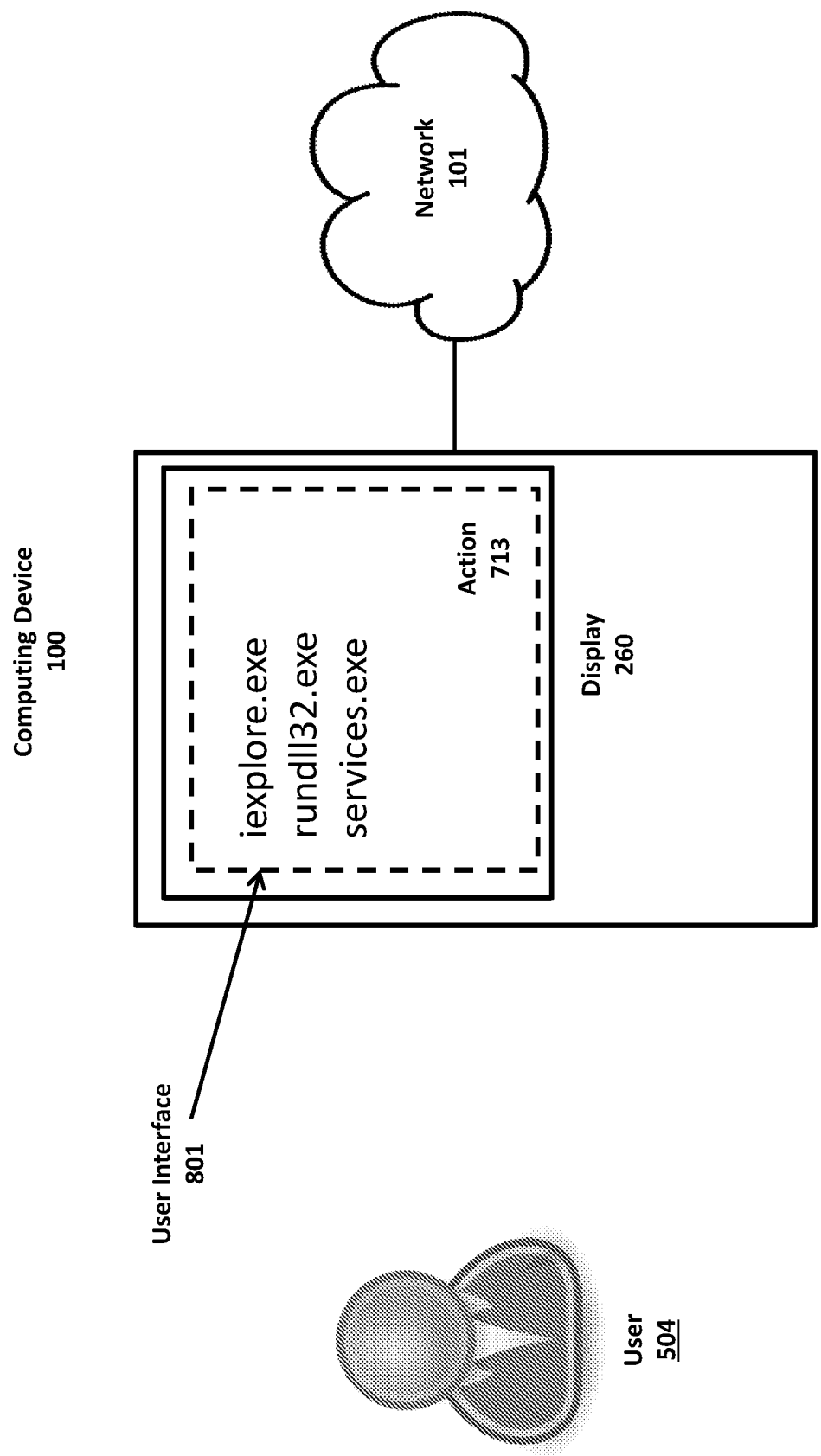
FIG. 8C depicts the computing device performing an action based on the intent of the utterance.

The embodiments are further illustrated in FIGS. 8A, 8B, and 8C. In FIG. 8A, user 504 writes or speaks utterance 711, which in this example is "Show processes for 1234123412341234 on Windows endpoints since Monday." This utterance is received by microphone 240 (which in turn is connected to speech-to-text engine 502) or input device 270 (such as a keyboard 270a) within computing device 100.

In FIG. 8B, computing device 100 performs the chatbot interface method 700 described previously with reference to FIG. 7, culminating in the determination of intent 712, "SHOW_PROCESS (hash, endpoint_type, date)".

In FIG. 8C, computing device 100 performs an action 713 based on intent 712, which in this example is to display the processes that were executed by Windows endpoints contained within network 101 since Monday within user interface 801 on display 260. User interface 801 optionally is a graphical user interface.

An important aspect of the embodiments is the ability of chatbot interface 601 to monitor the user's activity within computing device 100 and to take the context of that activity into account in analyzing text utterances 711.

Figure 9:
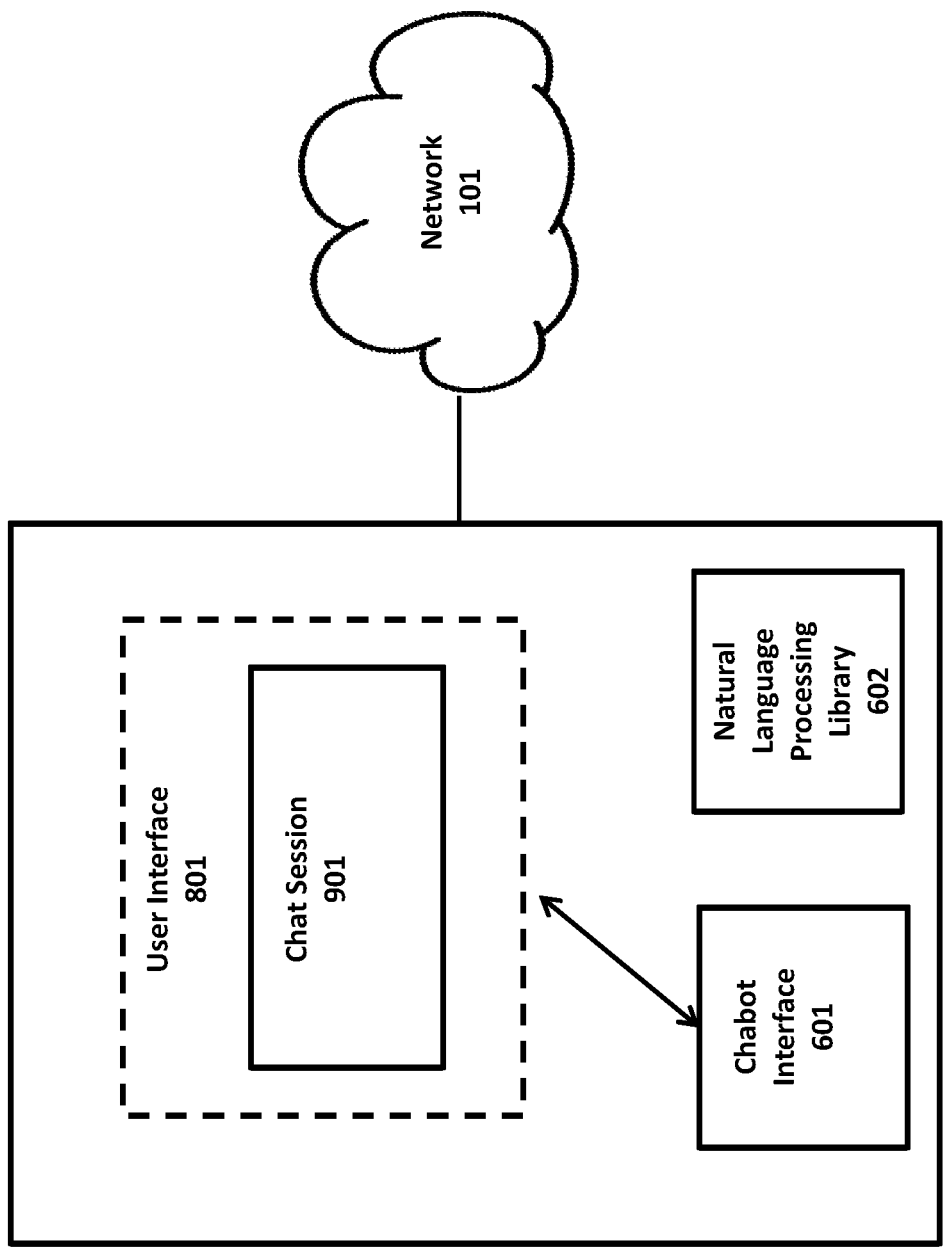
FIG. 9 depicts a chatbot interface engaging in a chat session.

In FIG. 9, chatbot interface 601 generates a chat session 901 in user interface 801. Chatbot interface 601 keeps track of the content in chat session 901 and considers that content in determining intent 712 of a command. Chatbot interface 601 also keeps track of all other content in user interface 801.

Figure 10:
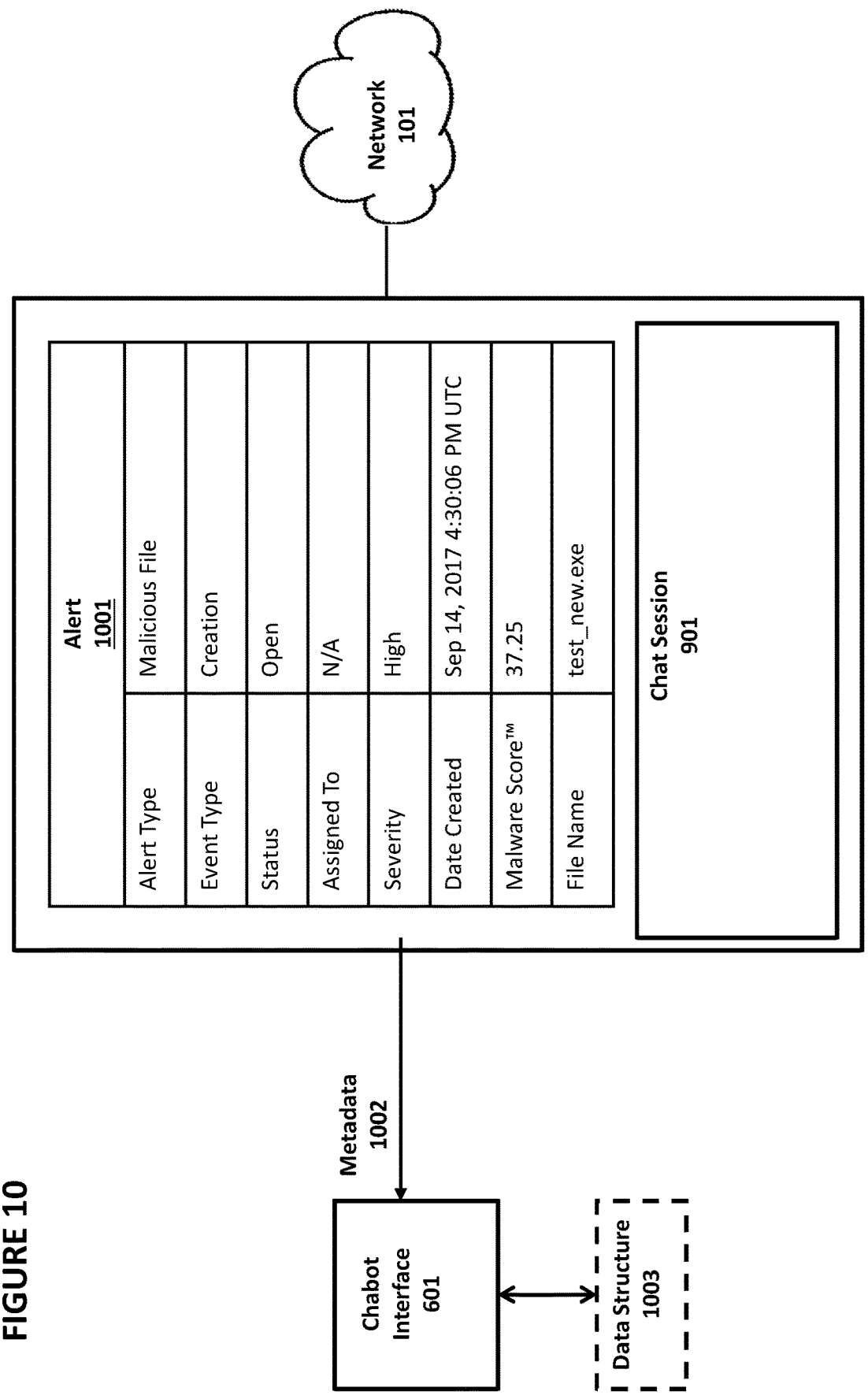
FIG. 10 depicts a chatbot interface obtaining metadata from an alert.

An example is provided in FIG. 10. Here, security application 603 generates alert 1001, which in this example is notifying user 504 that a malicious file has been detected. Chatbot interface 601 stores metadata 1002 for alert 1001 in data structure 1003 and identifies specific fields or data items in metadata 1002 that might be the subject of future user utterances and that might be referred to using pronouns or definite articles and stores a record of that association in data structure 1003. For example, chatbot interface 601 might create a record in data structure 1003 that associates the file name "text_new.exe" with the terms "this file" or "that file" or just "this" or "that."

Figure 11:
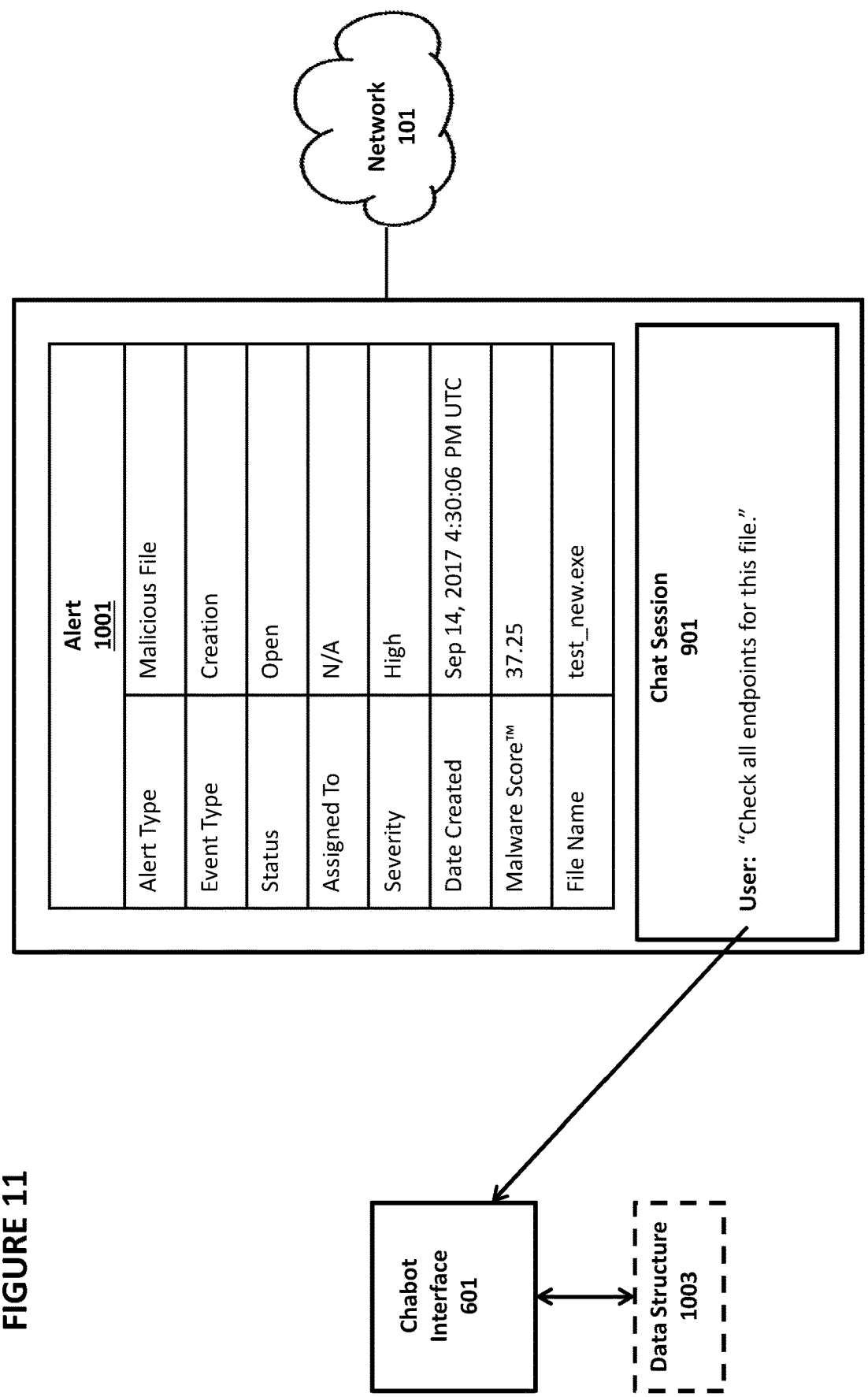
FIG. 11 depicts a chatbot interface engaging in an exemplary chat session with a user.

Thus, in FIG. 11, user 504 sees alert 1001 and then types or speaks the utterance, "Check all endpoints for this file." Because chatbot interface 601 already has analyzed metadata 1002 and generated data structure 1003, chatbot interface 601 can deduce that "this file" refers to a file with the file name "text_new.exe," and it can proceed to check all endpoints for that file.

Figure 12:
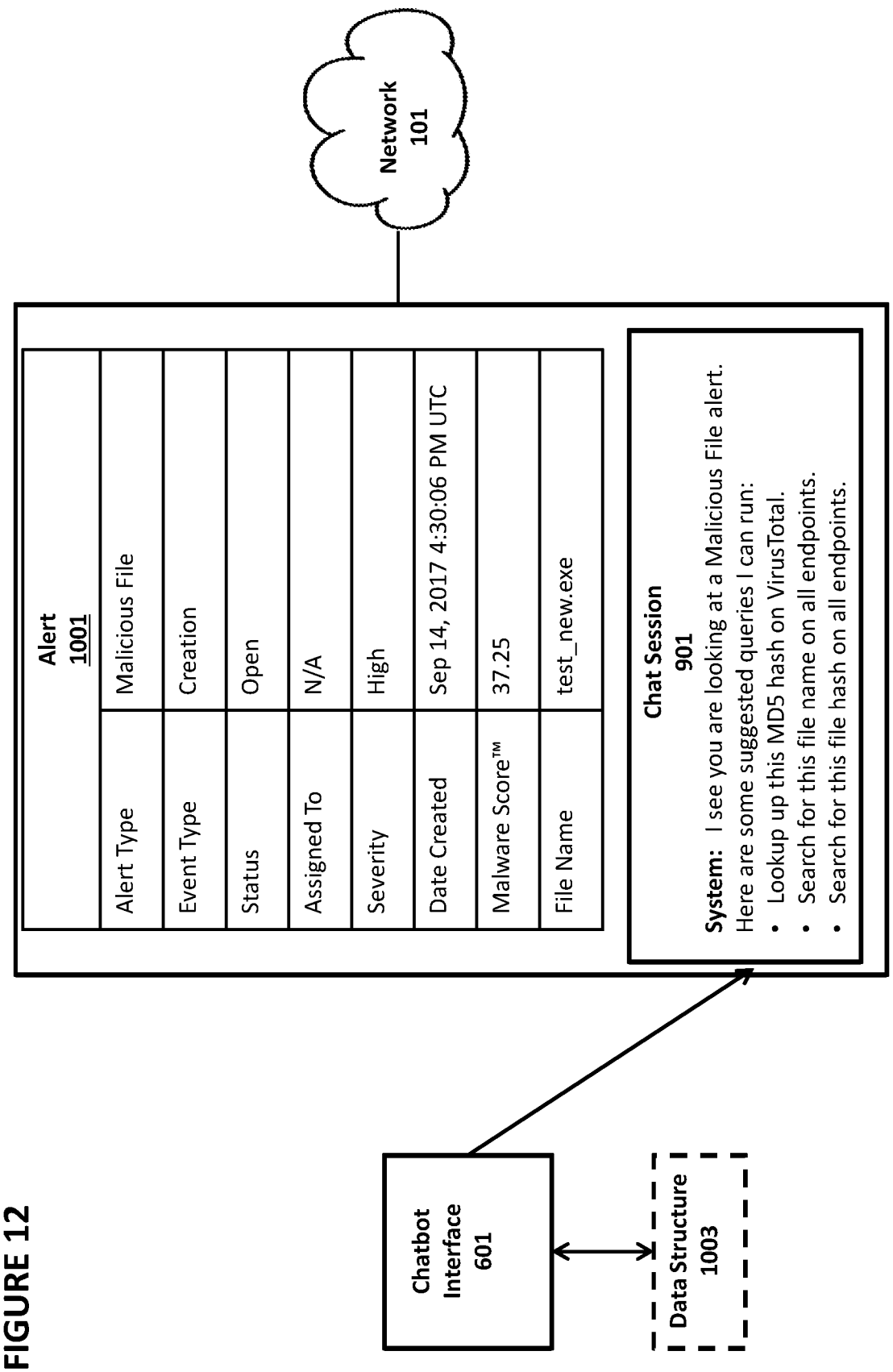
FIG. 12 depicts chatbot interface engaging in another exemplary chat session with a user.

FIG. 12 depicts another exemplary sequence of events. In FIG. 12, as soon as alert 1001 is issued and displayed within user interface 801, and after chatbot interface 601 analyzes metadata 1002 and generates data structure 1003, chatbot interface 601 can make suggestions to user 504. In this example, chatbot interface 601 makes the following suggestion in chat session 901:

System: I see you are looking at a Malicious File alert.
Here are some suggested queries I can run:
Lookup up this MD5 hash on VirusTotal.
Search for this file name on all endpoints.
Search for this file hash on all endpoints.

Chatbot interface 601 can make suggestions based on other events and conditions. For instance, if security application 603 is connected to other applications through APIs or other mechanisms, chatbot interface 601 can provide user 504 with suggested actions to take utilizing the other applications.

Figure 13:
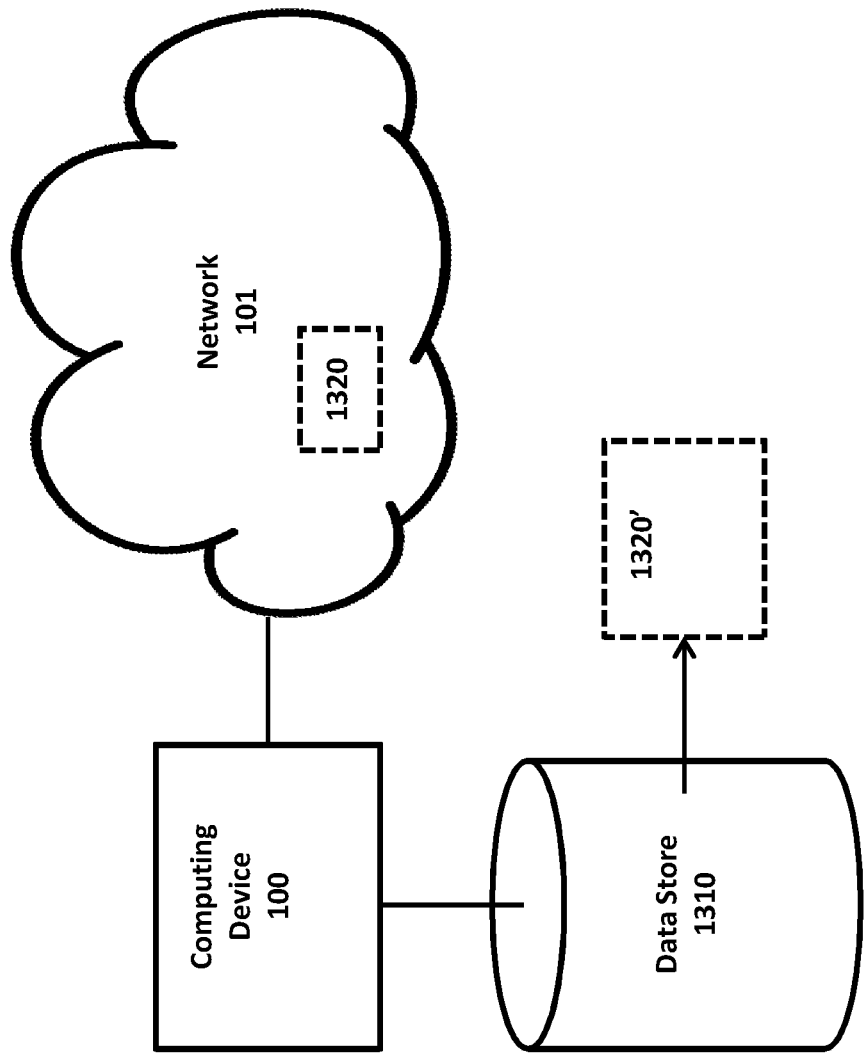
FIG. 13 depicts a computing device coupled to a data store containing historic information for devices on a network.

Examples of other suggestions that chatbot interface 601 can provide, such as through a chat session such as chat session 901 in FIG. 12, include:
Host Isolation
File Quarantine
File Delete
File Download
Registry Key Delete
Suspend Thread
Dump Thread Memory
Block IP
Sinkhole DNS
Whitelist/Blacklist File Another embodiment is shown in FIG. 13. In previous embodiments, computing device 100 was used to perform actions on network 101 in response to text utterances 711. In some situations, devices within network 101 might be unavailable at the time chatbot interface 601 performs action 713. For example, device 1320 (which might be another computing device, a communication device, an appliance, or other network component) might be offline or otherwise inaccessible to network 101. In such instances, computing device 100 optionally can obtain state information 1320' for device 1320 from data store 1310. State information 1320' comprises data indicating the last-known state of device 1320 (and optionally, the state of device 1320 at N historical instances, where N is an integer representing the number of snapshots taken of the state of device 1320) before it became inaccessible and can include the types of information that would otherwise have been retrieved had device 1320 been online, such as operating system version, IP address, hostname, etc. Using data store 1310, state information 1320', and state information for other offline devices of network 101, computing device 100 can execute action 713 using real-time data or near real-time data for all devices within network 101.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A device comprising:
a processor and memory for storing instructions for operating a Chabot interface to:
receive an utterance from a user utilizing an input device, the utterance comprising a text utterance of a voice utterance that is converted using a speech-to-text engine;
determine context of activity of the user relative to a computing device;
perform intent classification to determine an intent of the utterance;
incorporate the intent classification into the context of the activity; and
instruct a security application to perform an action based on the intent and the context.

2. The device of claim 1, wherein the chatbot is configured to determine one or more entities in the utterance that can include any one or more of filename, a username, a domain name, an IP address, a port, a process identifier, or a registry.

3. The device of claim 2, wherein the one or more entities in the utterance comprise a type of hash algorithm.

4. The device of claim 3, wherein the one or more entities in the utterance comprise an endpoint operating system, and endpoint hostname, or an endpoint IP address, wherein the endpoint is a device on a network.

5. The device of claim 1, wherein the activity comprises performing a search.

6. The device of claim 5, wherein the activity comprises performing a search of one or more entities in the text utterance.

7. The device of claim 1, wherein the activity comprises performing command and control hunting.

8. The device of claim 1, wherein the chatbot interface is configured to provide a recommendation to the user regarding a device on a network.

9. The device of claim 8, further comprising a data store containing state information for one or more devices previously coupled to the network.

10. The device of claim 1, wherein the input device is a keyboard.

11. The device of claim 1, wherein the input device is a microphone.

12. A method comprising:
receiving an utterance from a user utilizing an input device, the utterance comprising a text utterance of a voice utterance that is converted using a speech-to-text engine;
determining context of activity of the user relative to a computing device;
performing intent classification to determine an intent of the utterance;
incorporating the intent classification into the context of the activity; and
instructing a security application to perform an action based on the intent and the context.

13. The method of claim 12, further comprising determining one or more entities in the utterance that can include any one or more of a filename, a username, a domain name, an IP address, a port, a process identifier, or a registry, a type of hash algorithm, an endpoint operating system, and endpoint hostname, or an endpoint IP address, wherein the endpoint is a device on a network.

14. The method of claim 12, wherein the activity comprises any one or more of performing a search, performing a search of one or more entities in the text utterance, and performing command and control hunting.

15. The method of claim 14, further comprising providing a recommendation to the user regarding a device on a network.

16. The method of claim 15, further comprising storing state information for one or more devices previously coupled to the network in a data store.

17. A method comprising:
providing a chatbot interface that is configured to receive an utterance from a user utilizing an input device, the utterance comprising a text utterance of a voice utterance that is converted using a speech-to-text engine;
determining context of activity of the user relative to a computing device;
performing intent classification to determine an intent of the utterance with respect to the user, the intent classification further evaluating meaning of words of the utterance;
incorporating the intent classification including the intent and the meaning into the context of activity of the user relative to a computing system; and
instructing a security application to perform an action based on the intent classification and the context.

18. The method according to claim 17, wherein the activity includes user interactions with the computing system.

* * * * *